(12) United States Patent
Morales

(10) Patent No.: US 11,748,045 B1
(45) Date of Patent: Sep. 5, 2023

(54) METHODS AND PRINTING SYSTEM FOR REPORTING JOB COST INFORMATION

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 17/701,221

(22) Filed: Mar. 22, 2022

(51) Int. Cl.
G06F 3/12 (2006.01)

(52) U.S. Cl.
CPC .......... G06F 3/1237 (2013.01); G06F 3/1211 (2013.01); G06F 3/1219 (2013.01); G06F 3/1229 (2013.01)

(58) Field of Classification Search
CPC .... G06F 3/1229; G06F 3/1219; G06F 3/1211; G06F 3/1237
See application file for complete search history.

(56) References Cited

U.S. PATENT DOCUMENTS

| | | | |
|---|---|---|---|
| 6,981,015 B1 | 12/2005 | Palmer et al. | |
| 7,743,000 B2* | 6/2010 | Allen | G06K 15/00 705/400 |
| 9,798,505 B1* | 10/2017 | Soriano | G06F 3/1285 |
| 10,442,644 B1* | 10/2019 | Zakharov | B65H 7/06 |
| 2006/0203272 A1* | 9/2006 | Manalo | G06Q 10/02 358/1.14 |
| 2006/0221387 A1 | 10/2006 | Swift et al. | |
| 2006/0227354 A1* | 10/2006 | Farrell | G06F 3/1203 358/1.13 |
| 2008/0082461 A1* | 4/2008 | Kamata | G06Q 10/10 705/408 |
| 2008/0137132 A1* | 6/2008 | Perronnin | G06Q 30/02 358/1.15 |
| 2011/0063665 A1* | 3/2011 | Hirakawa | G06F 3/126 358/1.15 |
| 2015/0205546 A1* | 7/2015 | Darragh | G06F 3/1229 358/1.15 |
| 2021/0117741 A1* | 4/2021 | Eguchi | G06F 3/1248 |

* cited by examiner

Primary Examiner — John R Wallace
(74) Attorney, Agent, or Firm — MILLEN, WHITE, ZELANO & BRANIGAN, P.C.; William Nixon

(57) ABSTRACT

Print jobs may be broken down according to consumable types, job cost categories, and print speed to determine job costing information. Using this information, an operator can see how resources are being used for printing print jobs. After a print job is completed, the total number of pages, an amount of ink, or an amount of toner is allocated to at least one job costing category. Job costing categories include good use of the consumable type or waste. Waste is further broken down into additional job costing categories. This information also is broken into print speeds based on different media types, media trays, or printing devices. This process provides a more holistic overview of the costs incurred to finish a print job.

20 Claims, 14 Drawing Sheets

| | 802 | 804 | 806 | 808 | 810 | 812 |
|---|---|---|---|---|---|---|
| 800 | Media Type | High Coverage | Resolution | Paper Size | Low Speed Paper | Print Speed |
| 802A | Inkjet Matte | On | | | | 1/2 Speed |
| | | Off | 600x600 | | | 1/2 Speed |
| | | | | Banner | | 1/2 Speed |
| | | | | Others | Normal | 1/1 Speed |
| | | | | | Low Speed | 3/4 Speed |
| | | | 600x1200 | | | 1/2 Speed |
| 802B | Others | | 600x600 | | | 1/2 Speed |
| | | | | Banner | | 1/2 Speed |
| | | | | Others | Normal | 1/1 Speed |
| | | | | | Low Speed | 3/4 Speed |
| | | | 600x1200 | | | 1/2 Speed |

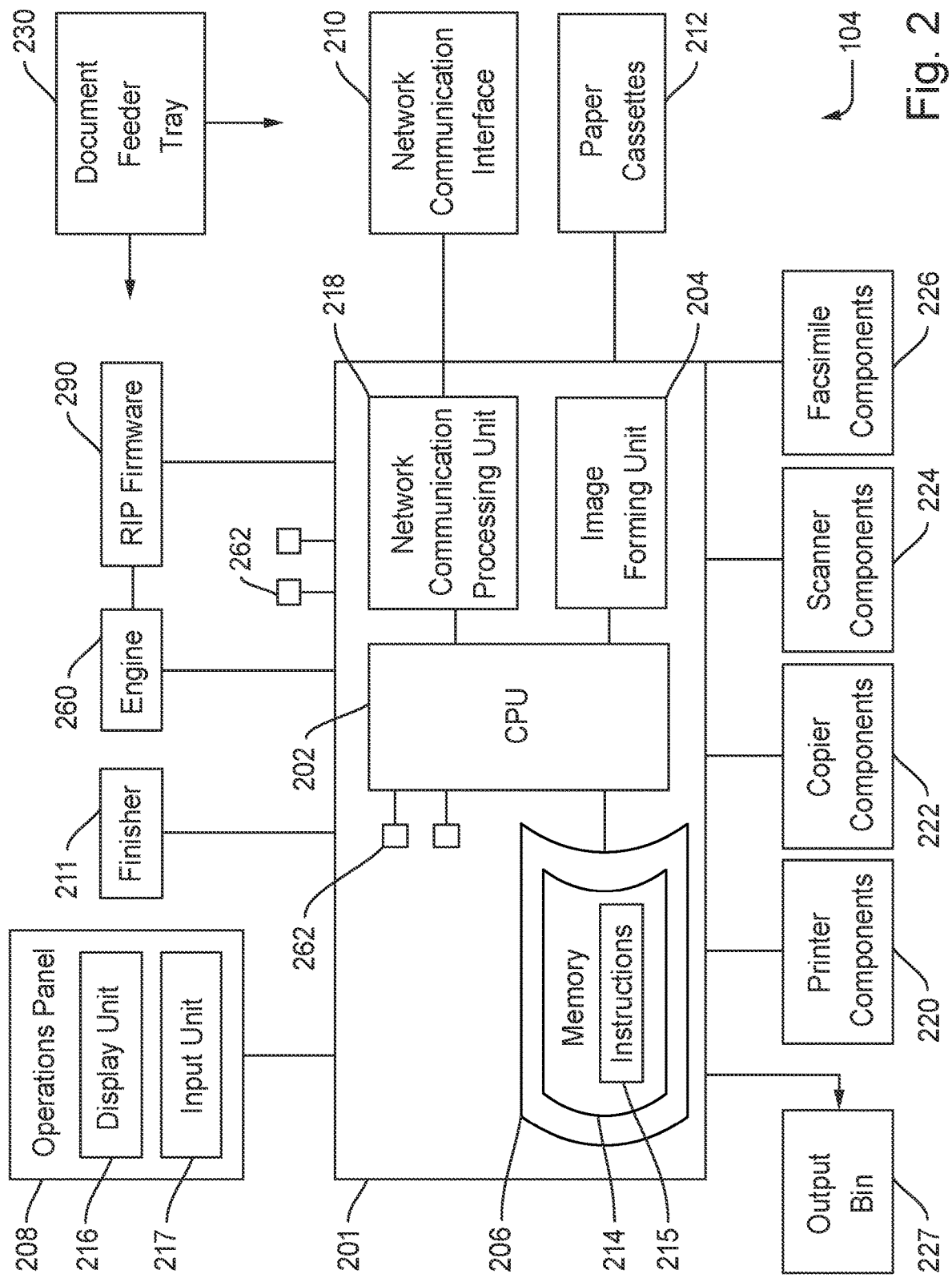

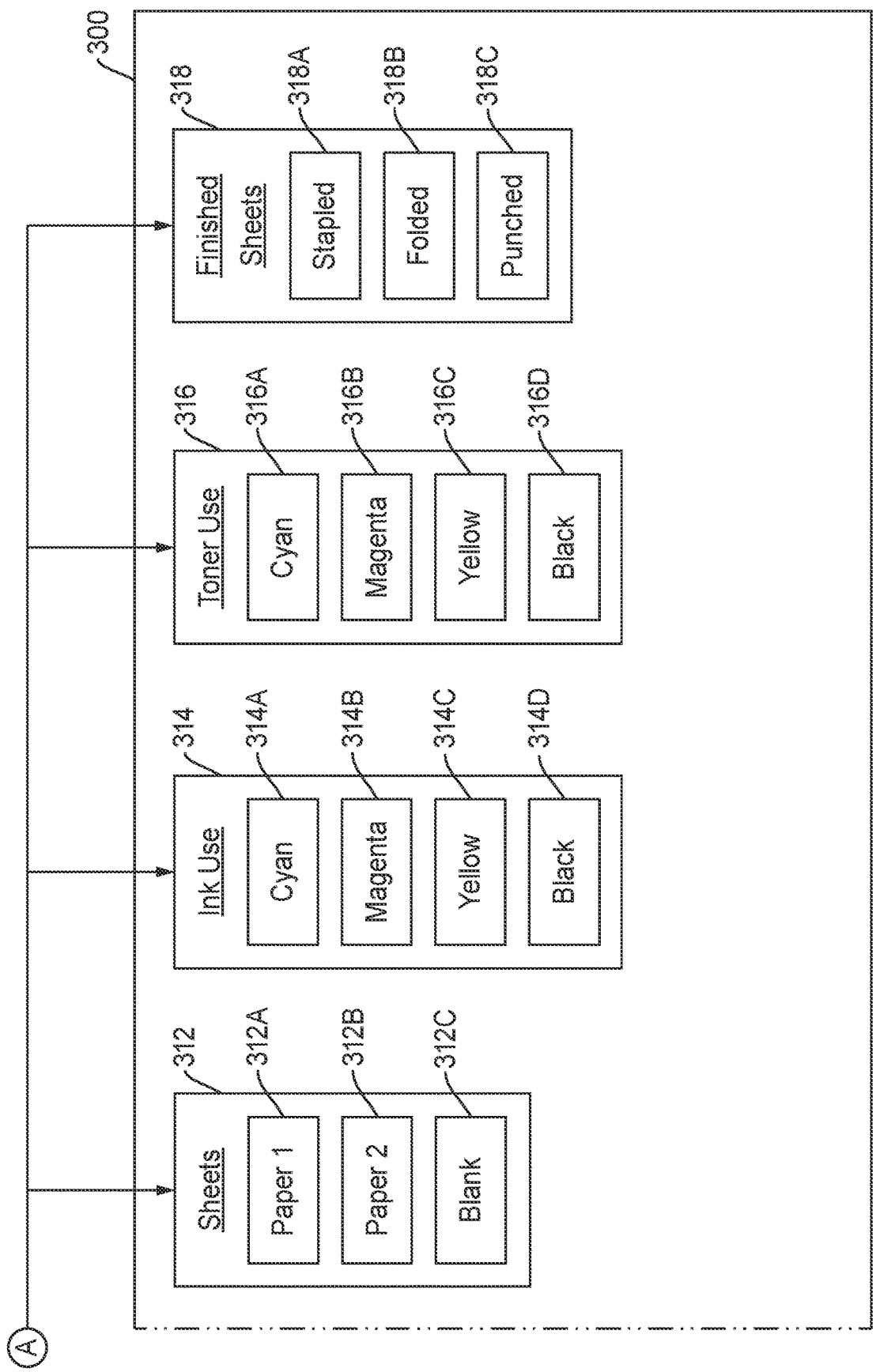

|  | Good | Auxiliary | Maint. | Quality Control | Paper Jam | Waste |
|---|---|---|---|---|---|---|
| PDL Pages |  |  |  |  |  |  |
| Impressions | X | X | X | X | X | X |
| Sheets | X | X | X | X | X | X |
| Ink | X | X | X | X | X | X |
| Toner | X | X | X | X | X | X |
| Stapled Sheets | X |  | X |  | X | X |
| Folded Sheets | X |  | X |  | X | X |
| Punched Sheets | X |  | X |  | X | X |

PDL / Impression Types: Color, Mono, Blank
Sheets Types: Media Definitions
PDL / Ink Type: Cyan, Magenta, Yellow, Black
Finished Types: Finishing Definitions

Fig. 5

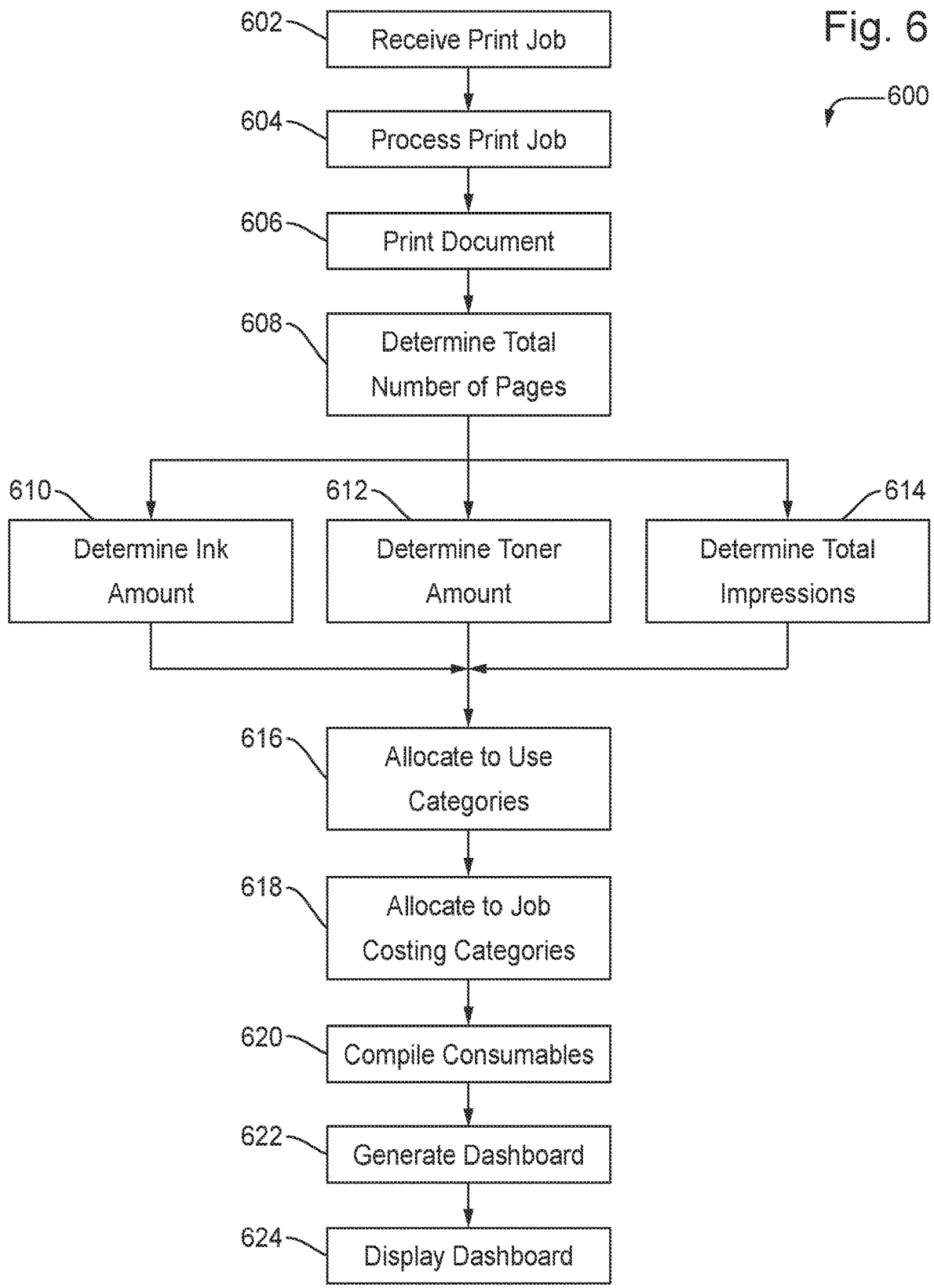

| | Media Type | High Coverage | Resolution | Paper Size | Low Speed Paper | Print Speed |
|---|---|---|---|---|---|---|
| | 802 | 804 | 806 | 808 | 810 | 812 |
| 802A | Inkjet Matte | On | 600x600 | | | 1/2 Speed |
| | | Off | 600x600 | | | 1/2 Speed |
| | | | | Banner | | 1/2 Speed |
| | | | | Others | Normal | 1/1 Speed |
| | | | 600x1200 | | Low Speed | 3/4 Speed |
| | | | 600x600 | | | 1/2 Speed |
| 802B | Others | | | Banner | | 1/2 Speed |
| | | | | Others | Normal | 1/1 Speed |
| | | | | | Low Speed | 3/4 Speed |
| | | | 600x1200 | | | 1/2 Speed |

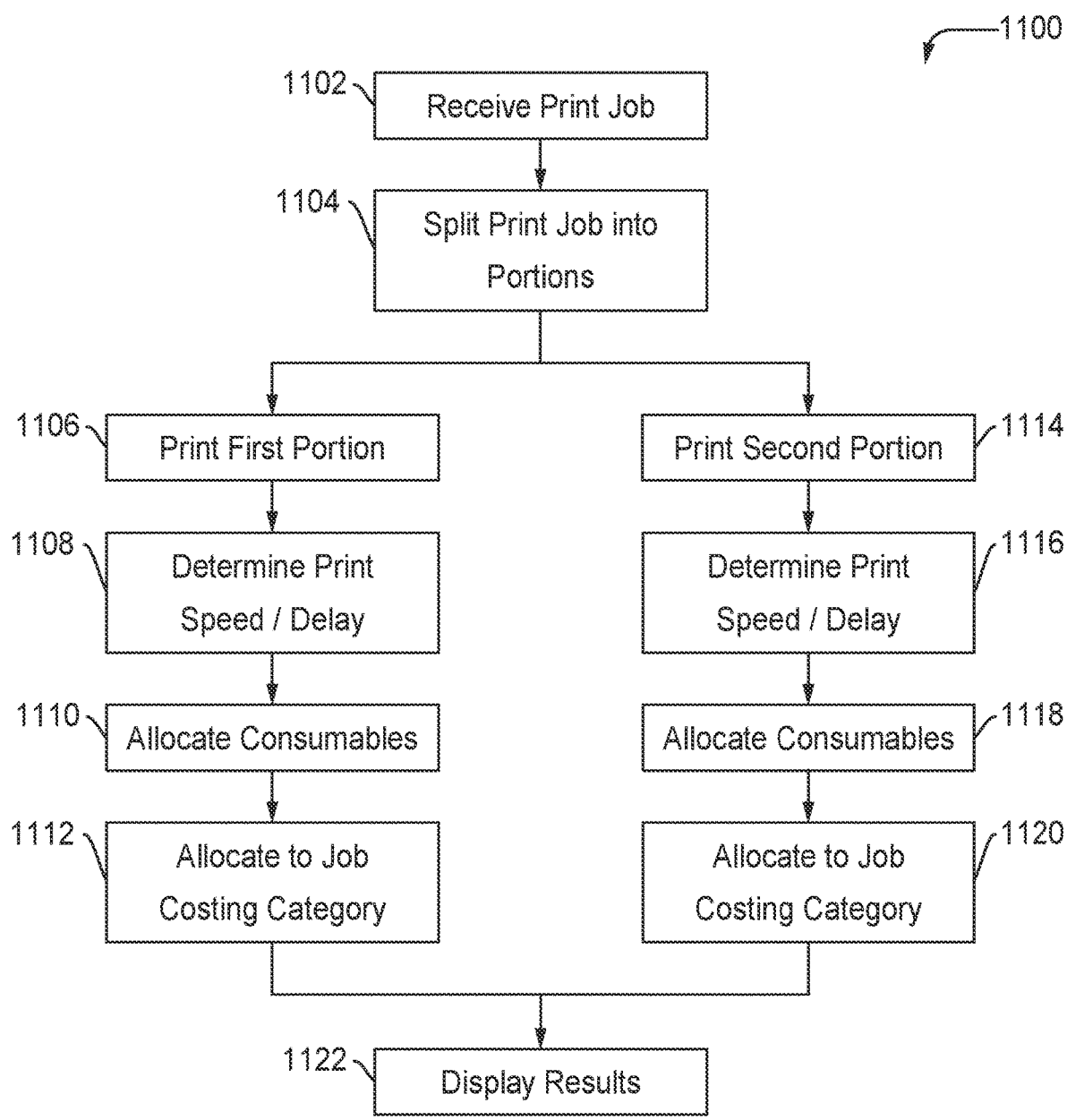

METHODS AND PRINTING SYSTEM FOR REPORTING JOB COST INFORMATION

FIELD OF THE INVENTION

The present invention relates to a printing system and associated methods to report job cost information for a print job at a printing device.

DESCRIPTION OF THE RELATED ART

For production printing shops, a printing device is considered to be revenue-generating manufacturing equipment. In order to be profitable, the print shop needs to understand how efficiently the printing device is being run. Several ways exist to monitor and evaluate equipment efficiency. Each way has something in common, which is that an operator has to specify whether what is produced is acceptable or not acceptable. These actions rely on the operator to make a determination and accurately report the determination at all times. This feature creates a situation in which uncertainty exists about the quality of the information that is compiled for a printing device. Further, a subjective element may creep into the operator's determination.

SUMMARY OF THE INVENTION

A method for reporting job cost information for a print job from a printing device is disclosed. The method includes printing the print job at the printing device. The print job uses consumables including a total number of sheets and an amount of toner or ink. The method also includes allocating each of the total number of sheets to at least one of a plurality of job costing categories. The method also includes allocating a portion of the amount of toner or ink to at least one of the plurality of job costing categories.

A printing system is disclosed. The printing system is configured to print a print job at the printing device. The print job uses consumables including a total number of sheets and an amount of toner or ink. The printing system also is configured to allocate each of the total number of sheets to at least one of a plurality of job costing categories. The printing system also is configured to allocate a portion of the amount of toner or ink to at least one of the plurality of job costing categories.

A method for reporting job cost information for a print job received at a printing device is disclosed. The method includes printing the print job at the printing device. The print job uses consumables at the printing device. The method also includes tracking the consumable used by a digital front end (DFE) of the printing device. The method also includes allocating each of the consumables to at least one of a plurality of job costing categories. The method also includes compiling the consumables allocated to each of the plurality of job costing categories.

A method for analyzing print job results is disclosed. The method includes receiving a print job at a printing device. The print job includes a total number of sheets. The method also includes printing the print job at the printing device using consumables including the total number of sheets. The method also includes detecting a first print speed for a first portion of the total number of sheets. The method also includes detecting a second print speed for a second portion of the total number of sheets. The second print speed is slower than the first print speed. The method also includes allocating a first amount of the consumables to the first portion of the total number of sheets associated with the first print speed. The method also includes allocating a second amount of the consumables to the second portion of the total number of sheets associated with the second print speed.

A method for analyzing print job results is disclosed. The method includes receiving a print job at a printing device. The print job includes a total number of sheets that uses consumables at the printing device. The method also includes printing a first portion of the total number of sheets from a first tray at the printing device. The method also includes printing a second portion of the total number of sheets from a second tray at the printing device. The method also includes allocating a first amount of the consumables to the first portion of the total number of sheets from the first tray. The method also includes allocating a second amount of the consumables to the second portion of the total number of sheets from the second tray.

A method for analyzing a print job is disclosed. The method includes receiving a print job at a first printing device. The print job includes a total number of sheets that uses consumables. The method includes printing a first portion of the total number of sheets from a first tray at the first printing device. The method also includes printing a second portion of the total number of sheets from a second tray at a second printing device. The method also includes allocating a first amount of the consumables to the first portion of the total number of sheets from the first tray. The method also includes allocating a second amount of the consumables to the second portion of the total number of sheets from the second tray.

BRIEF DESCRIPTION OF THE DRAWINGS

Various other features and attendant advantages of the present invention will be more fully appreciated when considered in conjunction with the accompanying drawings.

FIG. 2 illustrates a block diagram of components of the printing device for use within the printing system according to the disclosed embodiments.

FIG. 3B further illustrates the block diagram of the allocation of consumables to use categories for the job costing information according to the disclosed embodiments.

FIG. 5 illustrates a table of a summary of use categories and job costing categories according to the disclosed embodiments.

FIG. 6 illustrates a flowchart for reporting job cost information for a print job at a printing device according to the disclosed embodiments.

FIG. 8 illustrates a table of printing speeds for different media loaded onto the printing device according to the disclosed embodiments.

FIG. 11 illustrates a flowchart for analyzing print job results having different print speeds according to the disclosed embodiments.

DETAILED DESCRIPTION OF THE PREFERRED EMBODIMENTS

Figure 1A:
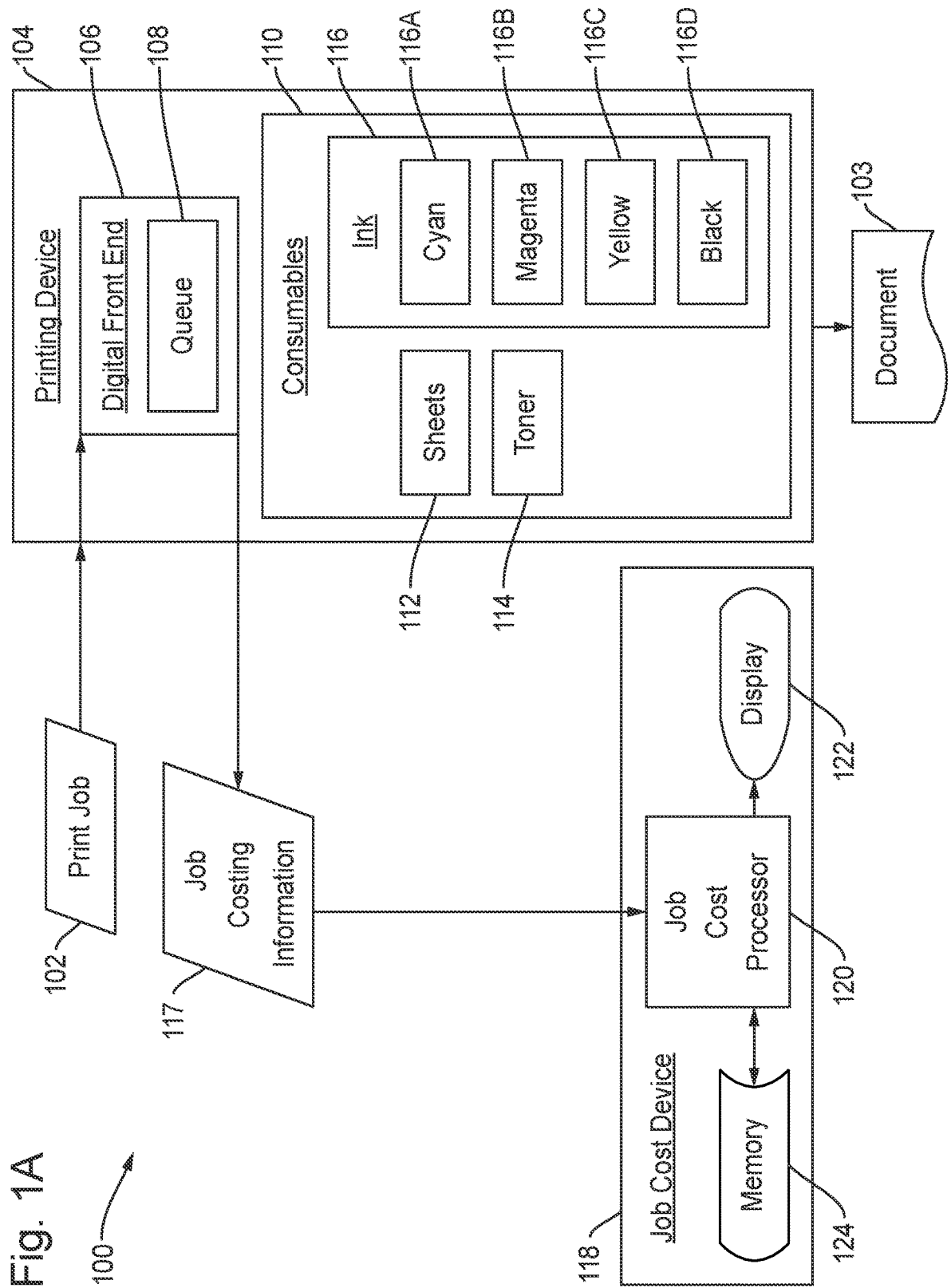
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide enhancements on how job costing information is reported by a printing device. For example, the disclosed embodiments provide automated reporting of good versus waste output for a print job or series of print jobs. Further, the disclosed embodiments report waste using multiple categories that the printing device is able to ascertain automatically.

Specifically, the printing device would report the following job costing information. It also would break the job costing information down into the use categories of job pages, impressions, sheets, toner or ink use, and finished sheets. For job pages, the disclosed embodiments may report color versus monochrome pages as well as page sizes. The disclosed embodiments also enhance this reporting with additional metrics. The job pages may include blank pages in that the disclosed embodiments evaluate pages in the job file and report pages that contain no content. In addition, the disclosed embodiments report pages that the DFE adds for production purposes.

Job pages also may include slow pages. The disclosed embodiments monitor performance on a per page basis and report pages that take significantly longer to process versus the median processing speed for all pages in the document. The threshold for considering that a page is "slow" may be user configurable. Further, the disclosed embodiments may report metadata for the slow pages so the print shop can determine why pages are slow as well as what remediation may be possible.

Another use category may be impressions. Impressions may differ from pages in that a small print job may include more impressions than a large one with few impressions. The use of consumables may differ depending on the number of impressions needed to complete the print job. The disclosed embodiments report the impressions for color printing versus monochrome printing. Highlight color impressions also may be reported. Impression size also may be reported. The disclosed embodiments enhance this reporting with additional metrics such as blank impressions. Blank impressions may be the impression counterpart for the blank PDL pages. This feature is meant to differentiate between blank pages that are added during print via an inserter versus blank pages that are added before print. The latter goes through the paper path thereby causing wear and tear for little to no benefit to the customer. These features may highlight process optimization possibilities to the print shop.

Another use category may be sheets, such as reporting for sheets used by each unique paper. The disclosed embodiments provide enhanced reporting with additional metrics. For example, the disclosed embodiments may report blank sheets. The blank sheets are similar to the reporting of impressions but at the sheet level.

Other uses for consumables include the use of toner or ink. The reporting may be for ink use by colorant. For example, print heads may be purged for every 1000 pages printed. This amount of ink is similar to blank pages or impressions disclosed above in that it does not contribute to preparing the print job. Finished sheets also may be reported.

In addition to the above enhancements to generally available job costing reporting, the disclosed embodiments provide enhanced all job costing reporting with information about how the resource was used. Multiple job costing categories may be considered. Job costing categories may include Good—resources that were part of a normal print job and printed normally;

Auxiliary—PDL pages that are designated to be "job banner pages," separator sheets, purge tabs and sheets, and other similar sheets that are needed to properly produce the print job;

Maintenance—print jobs printed as part of maintenance performance at the printing device when the printing device is put into a maintenance mode to perform these operations;

Color control—print jobs printed for calibration, ICC profiling, quality checks, registration checks, and adjustments;

Quality control—print defects that the print engine can detect;

Equipment malfunction—pages not printed correctly due to a problem with the printing device;

Paper jam—sheets damaged by paper jams; and

Waste—other sheets not delivered successfully to the output bin.

In addition to returning the above information, the disclosed embodiments also include a reporting system that will allow operators to selectively display the above categories of information. The reporting may be done using production dashboards. Unlike conventional products, the widgets in the dashboard are enhanced to give the operator the ability to display not just job costing data but job costing data for specific uses. This feature would allow the print shop to implement granular reports that would show data that is not available in existing production dashboard products.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client devices.

Printing device 104 receives print jobs through printing system 100. It may receive print job 102. After processing print job 102, printing device 104 prints or produces document 103 in a paper or media specified by the print job. Printing device 104 is disclosed in greater detail in FIG. 2. Printing device 104 also includes digital front end (DFE) 106, which facilitates processing print job 102. DFE 106 may be disclosed in greater detail in FIG. 1B. In addition to the components of DFE 106 disclosed in FIG. 1B, it also includes job queue 108 to hold print job 102 until it is ready to print. Job queue 108 may reorder print jobs therein based on criteria or operator instructions. For example, print job 102 may include instructions to place it at the top of job queue 108.

Printing device 104 also includes consumables 110. Consumables 110 may relate to items at or within printing device 104 but are not actually part of the printing device itself. Consumables 110, however, are used in printing operations. Consumables 110 include sheets 112 of paper or media. Sheets 112 may be loaded into trays at printing device 104. Consumables 110 also includes toner 114 and ink 116. Ink 116 further may be broken into different colorant inks. For example, ink 116 may include cyan ink 116A, magenta ink 116B, yellow ink 116C, and black ink 116D. If printing device 104 is not capable of color printing, then ink 116 may include only black ink 116D.

Print job 102 uses an amount of consumables 110 to produce document 103. In some embodiments, print job 102 produces thousands or more of a document. Thus, the amount of consumables used for print job 102 may be considerable. As disclosed above, printing system 100 needs to understand how efficiently printing device 104 is being run. The disclosed embodiments provide automated reporting of good versus waste in processing print job 102. They also report waste using multiple categories that printing device 104 is able to automatically ascertain.

The data created by tracking consumables 110 used for print job 102 may be shown as job costing information 117. Job costing information 117 may be broken into job costing categories as well as use categories. These features are disclosed in greater detail below. Job costing information 117 enhances the job costing reporting with information about a consumable resource used in generating document 103.

Printing system 100 may include job cost device 118 that tracks and stores information related to job costing information produced by printing print job 102. It also may break down job cost information 117 into categories, as disclosed below. Job cost device 118 is shown separate from printing device 104 but, in some embodiments, it may be part of the printing device. DFE 106 may enable job cost device 118. In other words, DFE 106 may break down the job costing information into the separate categories, as disclosed below. Job cost device 118 also may be located at a client device within system 100, such as a computer connected to printing device 104. As a separate device, job cost device 118 may allow the operator to review the incoming data in a dashboard. Such graphics and user interface capability may not be available at printing device 104.

Job cost device 118 include a job cost processor 120 that receives job costing information 117. In some embodiments, job cost processor 120 may categorize the information into categories for job costing reporting. In other embodiments, job cost processor 120 may receive job costing information 117 already categorized, as disclosed below. Job cost processor 120 may store this information along with the categorized data in memory 124. Display 122 may be a dashboard or visual display of the categorized data, as disclosed below. In some embodiments, job cost device 118 is part of printing device 104 and display 122 is one of the displays or panels implemented on printing device 104.

Figure 1B:
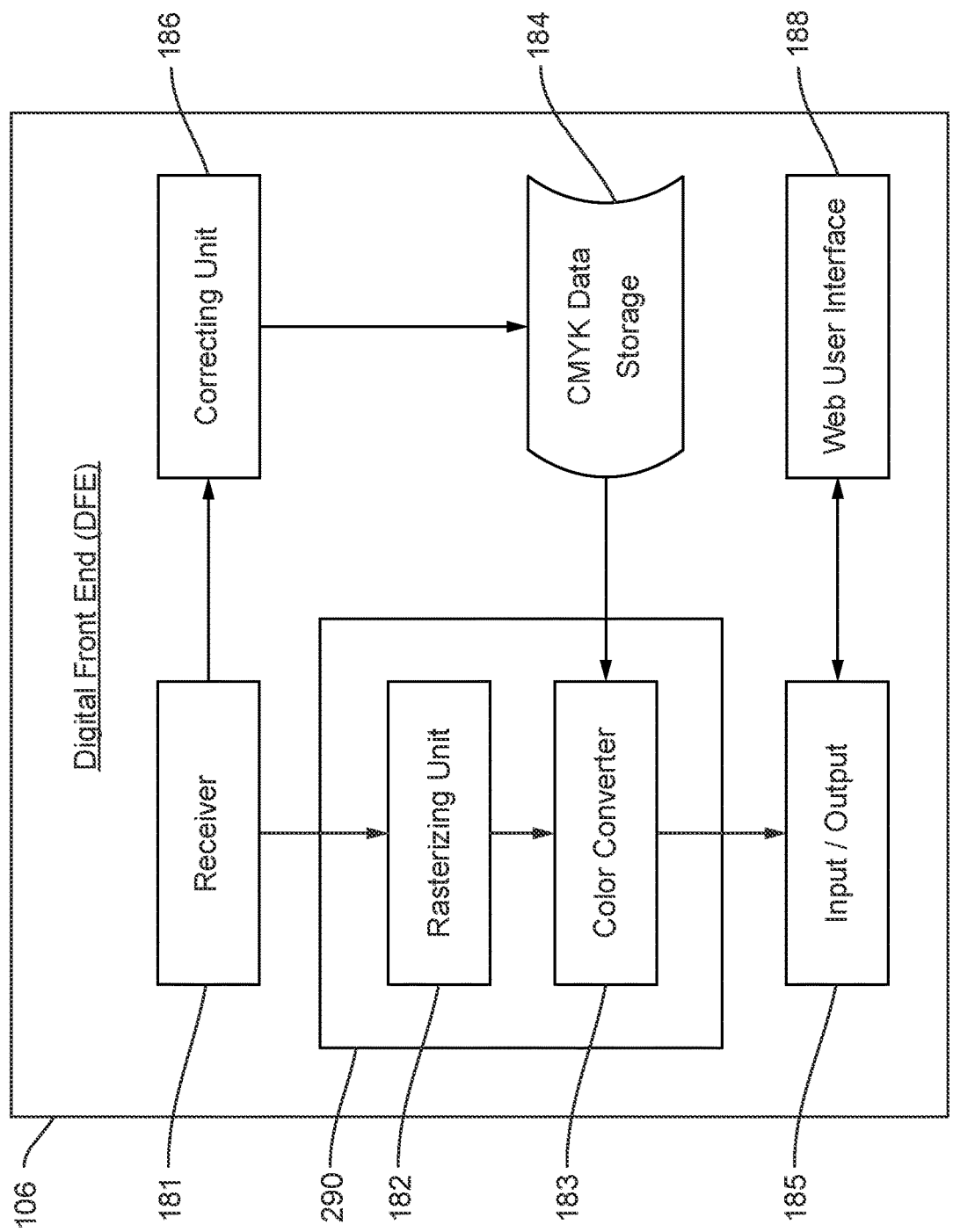
FIG. 1B illustrates a digital front end (DFE) for a printing device according to the disclosed embodiments.

FIG. 1B depicts a block diagram of DFE 106 according to the disclosed embodiments. DFE 106 includes a receiver 181, an RIP firmware 290 including rasterizing unit 182 and a color converter 183, a CMYK data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, includes job queue 108 and may include job cost device 118, even though these are not shown in FIG. 1B.

Receiver 181 receives print job 102 received within system 100 and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

RIP firmware 290 includes rasterizing unit 182 and color converter 183. The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or job cost device 118, if it is located at a separate device, using, for example, input/output connector 185. Web user interface 188, or web application, allows a user of the DFEs of other printing devices to interact with content or software running on DFE 106.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from job cost device 118, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as display 122 for job cost device 118, if the job cost device is implemented on printing device 104 or DFE 106. The job costing information and categories may be displayed using display unit 216.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from job cost device 118 as well as other printing devices within system 100.

Figure 3A:
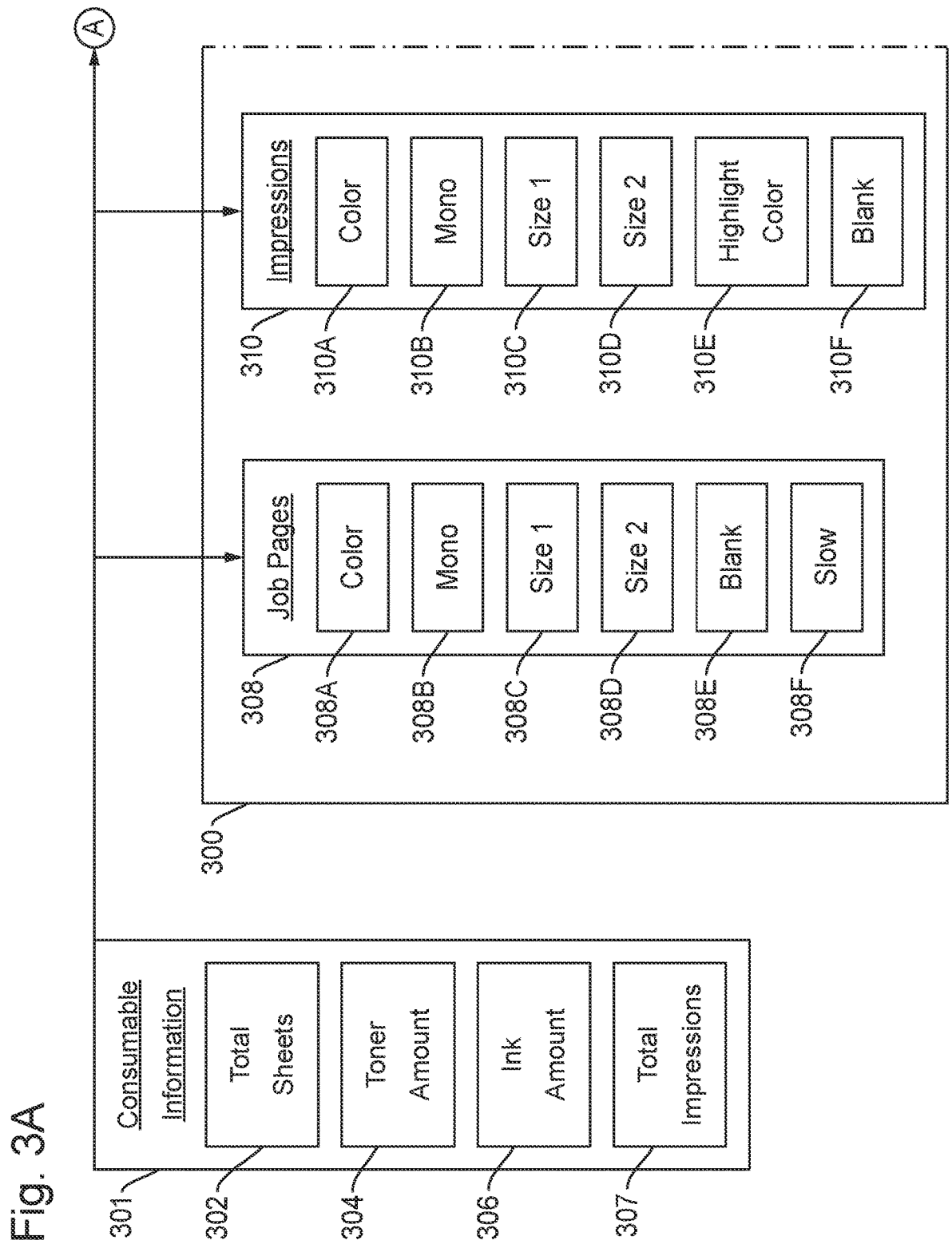
FIG. 3A illustrates a block diagram of the allocation of consumables to use categories for the job costing information according to the disclosed embodiments.

FIGS. 3A and 3B depict a block diagram of the allocation of consumables to use categories 300 for job costing information 117 according to the disclosed embodiments. Consumables used may be shown by consumable information 301, which includes total sheets 302, toner amount 304, ink amount 306, and total impressions 307 used to generate document 103 for print job 102. In some embodiments, document 103 may include 1000s or copies of a document for distribution. Thus, the amount of consumables used by printing device 104, as shown by consumable information 301, used to process print job 102 may be considerable.

Total sheets 302 may be the number of pages used to print document 103 from print job 102. Total sheets 302 may be a portion of sheets 112 available at printing device 104. Sheets may be counted per page. Total sheets 302 also may include sheets used as well. Total sheets 302 may take into account pages or sheets printed using different media. Total sheets 302 also may be provided by DFE 106. Sheets may not refer to the total number of PDL pages generated to complete print job 102.

Toner amount 304 is the amount of toner used to print document 103. Toner amount 304 may be a weight provided in grams, such as 0.012 grams. Toner amount 304 may include color and monochrome printing. Ink amount 306 is the amount of ink used to print document 103. Ink amount 306 may be a volume provided in liters, such as 0.000012 for 12 µLiters. Ink amount 306 also may include color and monochrome printing.

Total impressions 307 may represent the number of impressions printed for document 103. Impressions may relate to unique images generated for pages within print job 102. For example, document 103 may have 2000 pages of the same impression. Thus, the total impressions is 1. Alternatively, document 103 may have 20 pages, with each page resulting in a unique image for printing. Thus, the total impressions for this scenario is 20. A large number of impressions may result in a different cost than a print job with a lower number of impressions.

The disclosed embodiments may allocate the consumables of consumable information 301 into use categories 300. Use categories 300 may represent categories used to show job costing information 118. Use categories 300 may relate to the consumable type used for print job 102. According to the disclosed embodiments, use categories 300 may include job pages 308, impressions 310, sheets 312, ink use 314, toner use 316, and finished sheets 318. These categories may be combinations of actual attributes, such as color size 1, color size 1 slow, monochrome size 1, monochrome size 1 slow, blank size 1, color size 2, color size 2 slow, and so on.

Job pages 308 may be the category for reporting the different types of pages used by print job 102. Normally, such reporting would include color versus monochrome pages and the different pages sizes. Thus, job pages 308 includes categories for color pages 308A and monochrome pages 308B. Job pages 308 also includes pages having different sizes. For example, print job 102 may use letter sized pages and legal sized pages. As a result, job pages 308 include paper size 1 308C and paper size 2 308D. Paper size 1 308C may include pages having a letter size and paper size 2 308D may include pages having a legal size. These differences may be of interest as the cost per page may be different depending on the size of the respective page.

Job pages 308 also may include blank pages 308E. The disclosed embodiments evaluate the PDL pages generated for total sheets 302 and report pages that contain no content. Sometimes, blank pages end up in document 103 either by accident or by design in print job 102. A blank page may use few consumables as opposed to a page having text or a graphic. The disclosed embodiments report these pages as blank pages 308E. Blank pages added by DFE 106 for production purposes also may be reported.

Job pages 308 also may include slow pages 308F. The disclosed embodiments may monitor performance on a per page basis and report pages that take significantly longer to process versus the media processing speed for all pages in print job 102. For example, print job 102 may include 100 pages with 10 pages taking significantly longer to process and print than the other 90 pages. A threshold may be used to determine whether a page is "slow." For example, any page taking over 5 seconds to print may be deemed "slow" and allocated to slow pages 308F. The threshold may be user-configurable in that certain print jobs should print faster than others. The disclosed embodiments also may report metadata for slow pages so that printing system 100 can determine why these pages are slow and what remediation may be possible. Embodiments related to the speed of printing pages are disclosed in greater detail below.

Impressions 310 is another use category 300 that also may be reported in a known manner for color versus monochrome or impression sizes. The disclosed embodiments expand on this capability to include categories for other types of impressions. An impression may correspond to a single printed page from an image created for print job. Multiple pages may be printed from a single impression. Consumable information 301 includes total impressions 307. These impressions may be further categorized within impressions 310.

Color impressions 310A and monochrome impressions 310B correspond to impressions made for color printing and impressions made for monochrome, or greyscale, printing, respectively. Different sizes for impressions also may be made for print job 102. For example, impression size 1 310C may correspond to a letter size impression and impression size 2 310D may correspond to an envelope size impression. The resources needed to print the different impressions may differ for job costing information purposes. In many ways, impressions 310 treat its data like job pages 308.

The disclosed embodiments also enhance job cost reporting with additional metrics for categorizing impressions. Impressions 310 also include a category for highlight color impressions 310E. Impressions may be made for a specific color. The disclosed embodiments may allocate those impressions to this category. Blank impressions 310F may be the impression counterpart to blank pages 308E. This feature is meant to differentiate between blank pages that are added post print via an inserter as opposed to blank pages that are added before print. The blank pages and impressions added before print go through the paper path in printing device 104 thereby causing wear and tear for no benefit to the customer. Blank impressions 310F may highlight process optimization possibilities to printing system 100.

Sheets 312 of use categories 300 may include reporting for sheets used by each unique paper. Print job 102, for example, may use two different types of paper or two different paper mediums. The disclosed embodiments categorize the total sheets 302 into the respective types of sheets. Paper sheet 1 312A and paper sheet 2 312B may represent the two different types of paper or mediums used. The disclosed embodiments enhance reporting with additional metrics. Blank sheets 312C may be similar to blank pages 308E or blank impressions 310F but at the sheet level.

Use categories 300 includes ink use 314 and toner use 316. In some embodiments, these categories may be treated together. The disclosed embodiments show them separately as ink use may be reported by volume and toner use may be reported by weight. Reports for ink use or toner use by colorant is available. Ink amount 306 is allocated to different categories within ink use 314. These categories include ink used for the primary colors for color printing or cyan ink 314A, magenta ink 314B, yellow ink 314C, and black ink 314D. In some embodiments, no color printing is performed so that all of the ink use is allocated to black ink 314D.

Determination of ink use may be preferred as other operations are performed within printing device 104 that do not involve printing document 103. For example, print job 102 may request 50,000 copies of a document be printed. Printing device 104 may purge its print heads every 1000 pages. Thus, a portion of ink amount 306 is not used for printing operations but should be accounted for in job cost reporting.

Toner amount 304 is allocated to different categories within toner use 316. Toner differs from ink in that it may be like a powder and used for different printing operations than ink. Ink is more like a liquid than toner. Thus, these consumables should be accounted for differently by the disclosed embodiments. Toner amount 304 may be allocated to one of the four primary colors used for printing, or cyan toner 316A, magenta toner 316B, yellow toner 316C, and black toner 316D.

Use categories 300 also include finished sheets 318. Finished sheets 318 may relate to different finishing operations specified by print job 102. For example, print job 102 may call for stapled, folded, or punched sheets. Some number of total sheets 302 may be finished according to instructions. Finished sheets require extra operations and resources, such as staples, as opposed to pages just printed. Thus, finished sheets 318 may allocate pages to stapled sheets 318A, folded sheets 318B, and punched sheets 318C.

Thus, job costing information 117 may include values for the different use categories 300 disclosed above. These values may be reported upon completion of print job 102. DFE 106 may track the different pages, impressions and sheets in the printing process and the amount of ink and toner used. Allocation to the different categories may be done by DFE 106 or job cost device 118, if it is a separate device from printing device 104.

Figure 4:
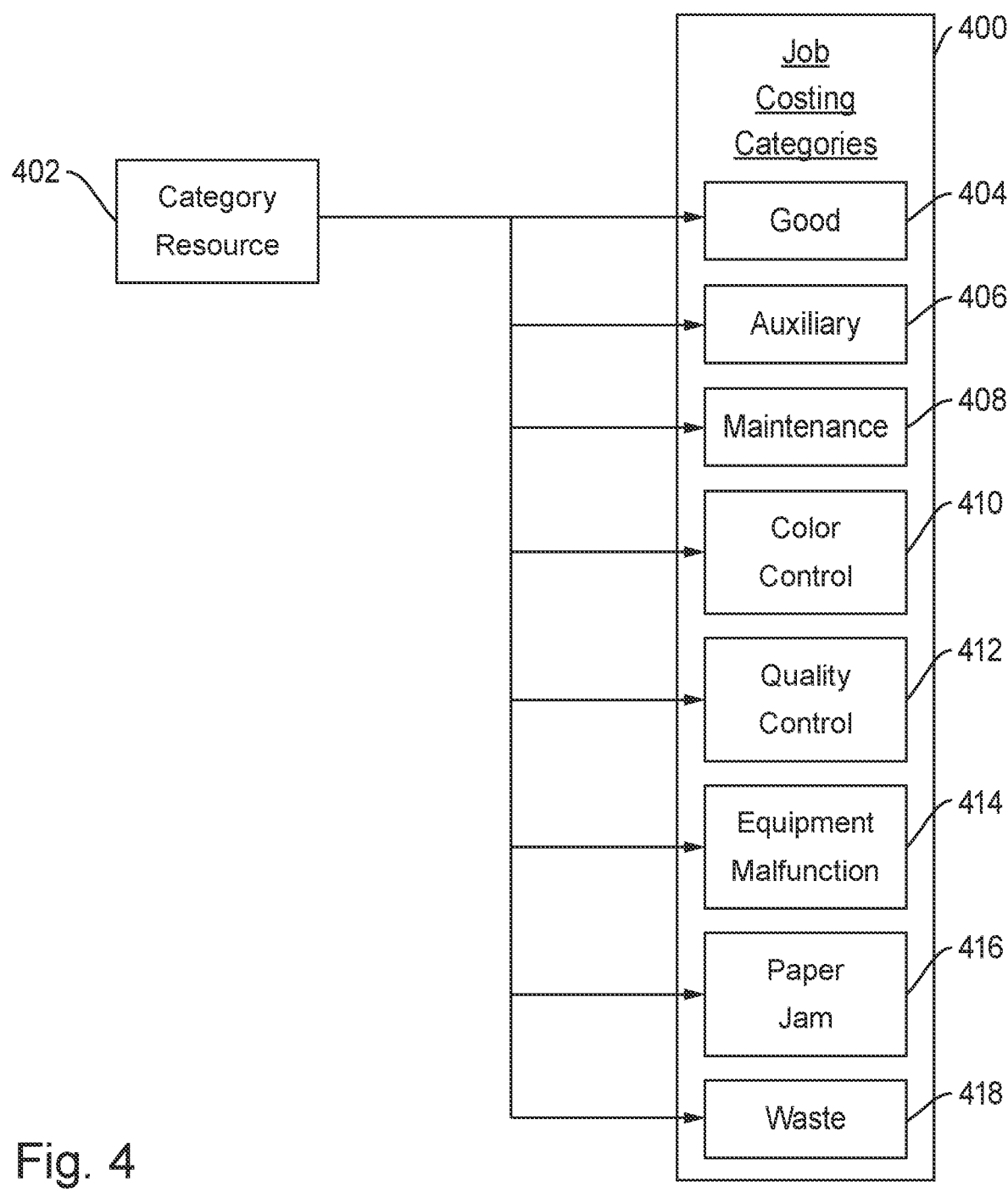
FIG. 4 illustrates a block diagram of the allocation of consumables to job costing categories of the job costing information according to the disclosed embodiments.

FIG. 4 depicts a block diagram of the allocation of consumables to job costing categories 400 of the job costing information 118 according to the disclosed embodiments. In addition to the above allocation of resources, the disclosed embodiments enhance all job costing reporting with information about how the resource was used. Thus, consumables information 301 may be further categorized or allocated into job costing categories. In some embodiments, the consumables allocated to the different use categories 300 disclosed above may be further allocated to job costing categories 400.

FIG. 4 shows category resource 402. Category resource 402 may relate to one of the categories disclosed above in FIGS. 3A and 3B, wherein categories 300 relate to a consumable type, such as color pages 308A of job pages 308 or paper sheets 1 312A. These resources allocated to the categories may be further broken down into job costing categories. In other words, the disclosed embodiments further identify how the resource or consumable type contributed to the overall cost for print job 102.

Job costing categories 400 includes a category for "good" and acceptable that indicates resources that were part of a normal job and printed normally. Thus, good job cost category 404 represents those resources of the print job printed correctly. Referring to stapled finished sheets 318A, those sheets stapled correctly and good will be placed into good job cost category 404.

For the remaining resources that are not included into good job cost category 404, these also are allocated to a job costing category that reflects how the resource was actually used. Auxiliary job costing category 406 may correspond to those PDL pages that are designated to be "job banner pages." "Job banner pages" refers to functionality that designates content from a job file to be a "job sheet" and not part of the normal aspects of print job 102. Resources placed into auxiliary job costing category 406 may include separators that are sheets added to demarcate jobs or job sections for production purposes. Separators, however, may not include cover insert sheets that are considered to be part of print job 102. Reports printed from the operations panel of printing device 104 also may be included in this category.

Auxiliary job costing category 406 also may include job sheets generated by the RIP and printed as banner pages. In other words, pages not part of print job 102 yet are properly printed according to a command or request. Auxiliary job costing category 406 also may include purged tabs when printing partial tab sets. For example, the tab paper has 5 tabs but print job 102 uses 11 tabs so that 4 tabs are wasted per copy of document 103.

Maintenance job costing category 408 may be used for resources used towards pages or print jobs printed as part of maintenance performance at printing device 104. Printing device 104 or DFE 106 may be put into a maintenance mode to perform these operations.

Color control job costing category 410 may be used for resources used for color printing checks or control. These include print jobs or resources printed for calibration, ICC profiling, quality checks, registration checks, and color printing adjustments. This category also includes jobs printed to flash inkjet head. Alternatively, this category may be used for ink or toner added to all printed pages in order to keep the inkjet heads clean. For example, pages may be printed to calibrate printing device 104. These pages are not part of the good category for print job 102 or auxiliary pages. Color control may come into play if print job 102 calls for 100,000 printed documents 103. Color control operations may need to be done even during printing operations for print job 102.

Quality control job costing category 412 may be used for resources used for quality control where printing device 104 prints defects that print engine 260 can detect, or inline quality detection. For example, in a jet out operation, print heads do not fire so a quality control operation may be done to detect automatically which print heads need service but not firing a specified print head.

Equipment malfunction job costing category 414 may be used for resources related to a malfunction within printing device 104. Paper jam job costing category 416 may be used for resources related to paper jams, such as sheets damaged by a paper jam. Paper jams may differ from equipment malfunction in that not all paper jam occur due to a problem with printing device 104. Waste job costing category 418 may be used for resources related to any other sheets not successfully delivered to the output bin.

Thus, job costing categories 400 may reflect those resources used to produce the sheets allocated thereto. A summary of job costing and use categories may be generated, as disclosed below to indicate how resources were used by printing device 104. A more granular view of the job costing parameters is provided using display 122. Thus, the disclosed embodiments also include a reporting system that allows operators and customers to selectively display the above disclosed categories of information.

FIG. 5 depicts a table 500 of a summary of use categories and job costing categories according to the disclosed embodiments. Table 500 includes consumed items 502, which relates to consumable information 301. Thus, PDL pages and impression types may include color, monochrome, and blank as disclosed above. Sheet types may be media definitions. Ink type may be cyan, magenta, yellow, and black. Finished sheet types may be defined.

Table 500 shows which job costing use categories are applicable to the use categories. For example, PDL pages 504 may not include any job costing categories. Impressions 310, as shown above, may be allocated to categories 404, 406, 408, 410, 416, and 418, as disclosed above. In other words, impressions may be allocated to jam category 416 and waste category 418. Same with sheets 312, ink use 314, and toner use 316. Finished sheets 318, however, may differ from the others in that none of the finished sheets should not be allocated to, or used for, auxiliary job costing category 406. In other words, stapled sheets 318A, folded sheets 318B, and punched sheets 318C are not used as an auxiliary or quality control sheet.

FIG. 6 depicts a flowchart 600 for reporting job cost information for print job 102 at printing device 104 according to the disclosed embodiments. Flowchart 600 may refer to FIGS. 1A-5 for illustrative purposes. Flowchart 600, however, is not limited to the embodiments disclosed by FIGS. 1A-5.

Step 602 executes by receiving print job 102 at printing device. Specifically, DFE 106 may receive print job 102 and places it into job queue 108. Step 604 executes by processing print job 102 in accordance with normal printing operations. Step 606 executes by printing document 103 for print job 102 at printing device 104. It should be noted that document 103 may be any number of copies of a document for print job 102. In other words, print job 102 may order that 1000s, 10,000s, 100,000s or more of a document be printed at printing device 104. Such large orders will consume a considerable quantity of sheets 112, toner 114, and ink 116 available at printing device 104. The disclosed embodiments provide a process to account for the consumables used to process and print job 102.

Step 608 executes by determining a total number of sheets, or total sheets, 302. For example, print job 102 may print 1200 pages for document 103. Step 610 executes by determining ink amount 306 to print the pages for print job 102. Step 612 executes by determining toner amount 304 to print the pages for print job 102. Step 614 executes by determining the total impressions 307 generated to print the pages of print job 102. As disclosed above, the total number of impressions may differ from the total number of pages printed in a print job.

Step 616 executes by allocating the consumable types of pages, ink, toner, and impressions to use categories 300, as disclosed above. Consumables are items used to produce print job 102. These items also may include sheets and finished sheets. The disclosed embodiments determine which ones are applicable to print job 102. For example, print job 102 may not include any color printing so that no consumables are allocated to color pages 308A.

Step 618 executes by allocating resources noted in the use categories to job costing categories 400, as disclosed above. Preferably, there is a plurality of job costing categories, as shown in FIG. 4. Job cost device 118 may determine what category that a page belongs to. For example, DFE 106 may add metadata on the page data to job cost device 118, which uses this data to allocate the page. The same process may occur for the impressions to print the pages for print job 102. Through this information, the ink use and the toner use may be determined.

Step 620 executes by compiling the consumables allocated to each job costing category. For example, the pages, impressions, sheets, ink, toner, and finished sheets are compiled for each of good, auxiliary, maintenance, color control, quality control, equipment malfunction, paper jam, and waste. Step 622 executes by generating a dashboard to display each consumable along with at least one job costing category associated with the respective consumable. A dashboard is disclosed in greater detail below. Step 624 executes by displaying the dashboard using job cost device 118. Preferably, the disclosed embodiments may use display 122.

An example is provided below of the disclosed embodiments providing job cost information for print job 102. Print job 102 may specify that 50 sheets are being printed for each unique media definition. In this example, the media may be letter-sized white paper for a specific brand. Print job 102 is printed on printing device 104 such that document 103 prints a certain amount of pages. The disclosed embodiments determine that the sheets printed for document 103 include 50 good sheets, 5 auxiliary sheets, 1 maintenance sheet, and 3 paper jam sheets. Thus, total sheets 302 are 59 sheets. This number differs from the 50 sheets of print job 102.

DFE 106 also may report that print job 102 resulted in total impressions 307. For example, letter-sized impressions for the letter-sized media includes 100 impressions for print job 102. This number is due to duplex printing so that 50 sheets equals 100 impressions. Each page may be unique so that no impression is used twice. It also highlights the difference between a page in document 103 and a sheet. A page may be one side printed on the sheet. Within total impressions 307, the following may be determined. The number of color impressions 310A is 25 and the number of monochrome impressions is 87. The disclosed embodiments may allocate these values to job costing categories 400.

Using the above example, color impressions 310A may be allocated as follows. Good job costing category 404 includes 20 impressions. Maintenance job costing category 408 includes 1 impression. Paper jam job costing category 416 includes 4 impressions. No impressions are allocated to auxiliary job costing category 406, color control job costing category 410, quality control job costing category 412, equipment malfunction job costing category 414, or waste job costing category 418.

Monochrome impressions 310B may be allocated as follows. Good job costing category 404 includes 80 impressions. Auxiliary job costing category 406 includes 5 impressions. Paper jam job costing category includes 2 impressions.

A dashboard for the above example would show that 50 sheets of print job 102 were printed, with 10 printed in color. Further, 5 auxiliary sheets were printed, such as 1 cover sheet and 4 separator sheets. A single maintenance sheet was printed as an inkjet head purge sheet. Three jammed sheets were used as well, with 2 color sheets and 1 monochrome sheet.

Figure 7A:
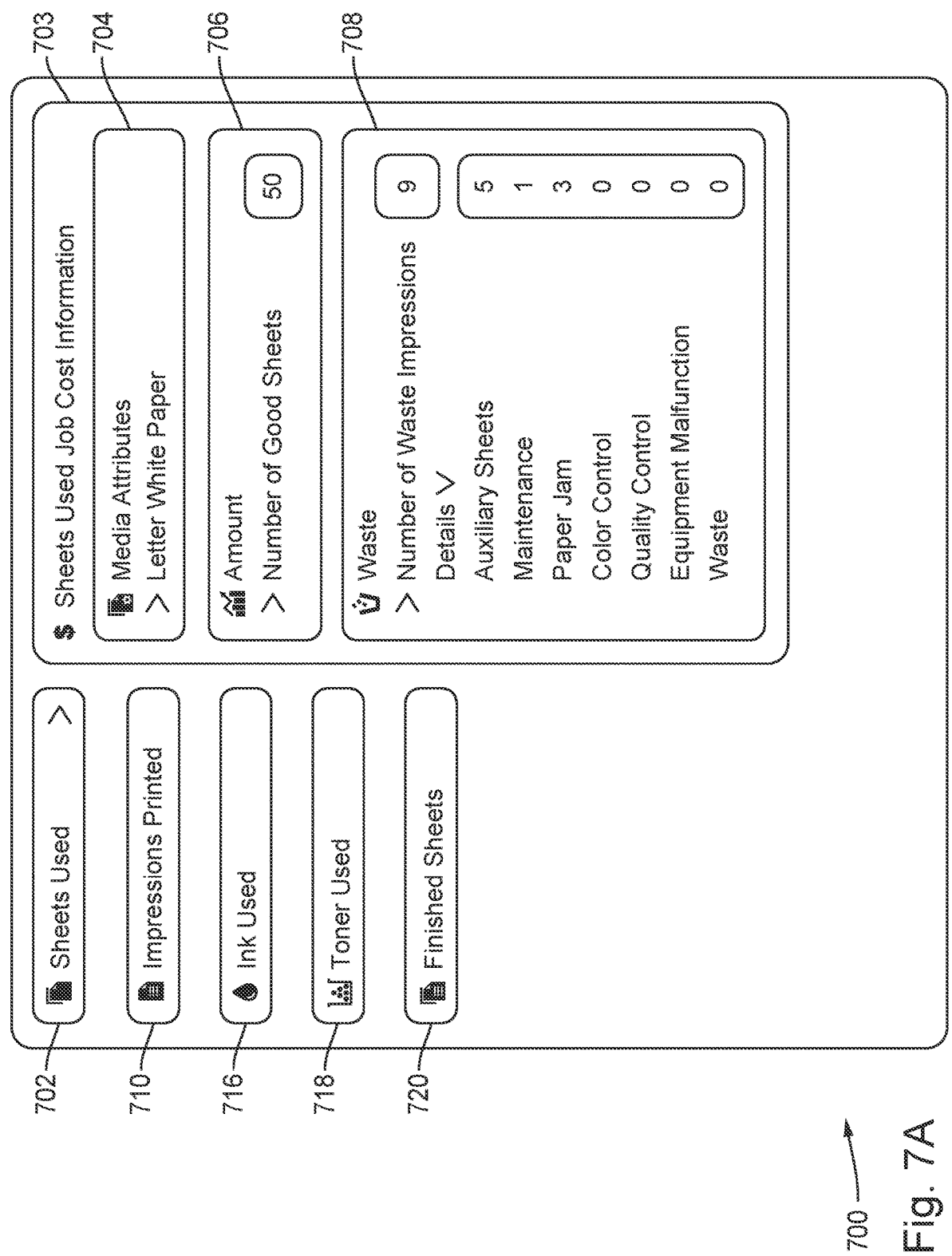
FIG. 7A illustrates an example dashboard for use in reporting job cost information according to the disclosed embodiments.
Figure 7B:
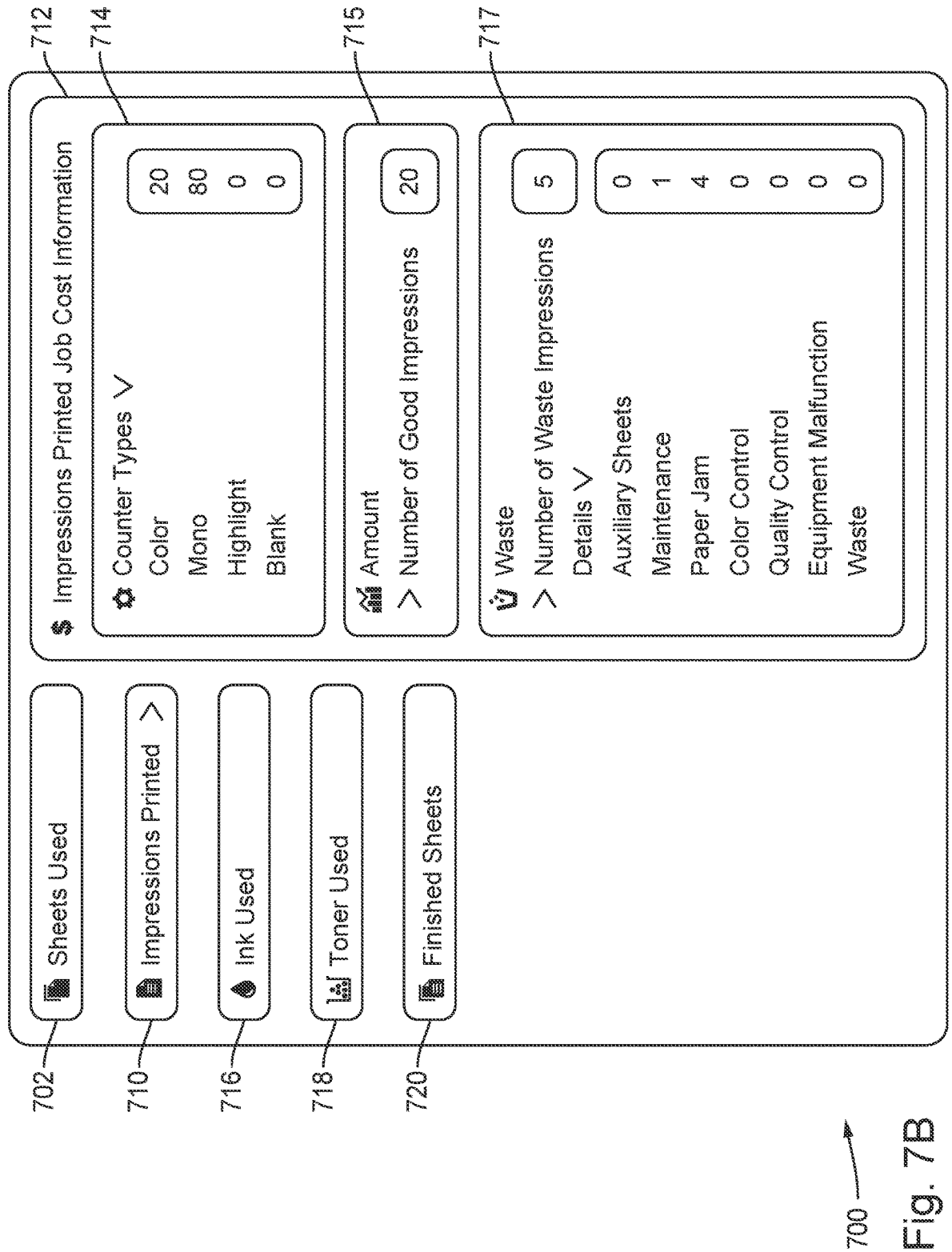
FIG. 7B further illustrates the example dashboard for use in reporting job cost information according to the disclosed embodiments.

FIGS. 7A and 7B depict an example dashboard 700 for use in reporting job cost information according to the disclosed embodiments. Dashboard 700 may include information made available to an operator of printing device 104 about the job costing information for print job 102. Dashboard 700 may be displayed on display 122 of job cost device 118. Alternatively, dashboard 700 may be displayed on printing device 104.

Dashboard 700 may include buttons of various consumable types to select further information for a print job. For example, dashboard 700 may include sheets used button 702, which corresponds to sheets 312. It also may include impressions printed button 710, which corresponds to impressions 310. Ink used button 716 may correspond to ink use 314. Toner used button 718 may correspond to toner use 316. Finished sheets button 720 may correspond to finished sheets 318. Though not shown, a pages button may be included as well that corresponds to job pages 308.

When selected, a button in dashboard 700 may retrieve job costing information to display further information regarding the consumables to generate print job 102. The information may differ depending on the consumable type being selected. For example, sheets used button 702 may be selected. The disclosed embodiments access job costing information 117, which may be stored in memory 124 of job cost device 118. Using the categorized information, dashboard 700 displays the applicable job cost information.

In this instance, sheets used job cost information 703 includes values for the job costing categories determined for a print job. Using the example disclosed above, sheets used job cost information 703 displays the information for the sheets used to complete print job 102. Thus, field 704 denotes the media attributes for print job 102. In this example, letter sized white paper is used. Field 706 relates to an amount of sheets used that are allocated as "good" sheets, or to good job costing category 404. As indicated by the example, this number is 50 sheets. Field 708 relates to an amount of sheets categorized as waste, or the number of waste sheets. Using the above example, this value is 9 waste sheets.

Field 708 also includes further information regarding the waste sheets, as allocated using the embodiments disclosed above. Waste details may include auxiliary sheets, which are sheets used for printing device reports and disjointing insert sheets. Using the above example, this value is 5. Waste details also include maintenance, which are sheets used for maintenance and has a value of 1. Other details include paper jam, or jammed sheets, that has a value of 3 using the above example. The remaining details do not have values as no sheets were allocated to their corresponding job costing categories. In some embodiments, these details may not be displayed in waste field 708.

In some embodiments, sheets used job cost information 703 may be split further according to color sheets and monochrome sheets. Further, separate sheets used job cost information may be made available for different media or different sizes for the same media. Dashboard 700, therefore, may include additional buttons to select the different categories.

Dashboard 700 also includes impressions printed button 710. If selected, this button causes job cost device 118 to retrieve additional information from job costing information 117. This information will be related to impressions category 310. Impression job costing information 712 includes field 714 having values for the different types of impressions allocated as disclosed above. These counter types include color for color impressions, mono for monochrome impressions, highlight color for specified color impressions (for example, this may relate to China Red impressions of black and red ink), and blank for blank impressions. Using the above example, the values for these types are displayed. Color impressions include a value of 20 and monochrome impressions include a value of 80. As no highlight or blank impressions were allocated, these types do not include any values.

Dashboard 700 also may allow an operator to further select additional information for review. Thus, color type may be selected from field 714. The disclosed embodiments retrieve additional job costing information 117. Color impression job costing information may be displayed. This information includes field 715 for an amount of the number of good impressions. According to the above example, this value is 20. Field 717 corresponds to impressions allocated to waste categories. Thus, details include similar features as those disclosed for sheets used job costing information 703.

Using the above example, auxiliary sheets relates to the impressions used for printing device reports, which is a value of 0 for color impressions. Maintenance relates to impressions for maintenance, which is a value of 1 for color impressions. Paper jam relates impressions for jammed paper, which is a value of 4 for color impressions. The remaining details of color control, quality control, equipment malfunction, and waste have values of 0 for color impressions.

Other job costing information available on dashboard 700 may display the values and categories/details differently. For example, though not shown, selection of ink used button 716 or toner used button 718 may result in the respective job costing information to be displayed. Ink or toner used may be separated by colors of ink, such as cyan, magenta, yellow, and black. Thus, an operator may select the entire ink used to view job costing information or may select a specific color. The fields for this information would include amount of ink used for good impressions, in volume for ink or weight for toner. Another filed would include waste, which is ink or toner used for waste impressions, as determined above.

Under details for waste, the disclosed embodiments would display auxiliary sheet ink or toner used for reports by printing device. Maintenance would indicate the ink or toner used for maintenance. Paper jam would indicate ink or toner used for jammed sheets. Color control would indicate the ink or toner used on color control operations. Equipment malfunction would indicate ink or toner used for impressions with detected printing device defects. Quality control would indicate ink or toner used for jobs with quality control operations. Waste would indicate ink or toner used for other printing that was not good.

The disclosed embodiments also may categorize consumable types according to print speeds used by printing device 104. Not all sheets are printed at the same speed. For example, color printing may take longer than monochrome printing. As such, time to complete print jobs also is a "consumable" in that print jobs that take a long time to complete results in less revenue generated by the printing device. An operator may wish to also have this information available on dashboard 700.

For example, if print job 102 calls for 10 color sheets using the example disclosed above, then some aspects of printing these sheets may cause a delay in completing the print job. Using the above example, two of the color sheets are covers that use premium inkjet matte paper as opposed to the normal white letter sized paper. The premium matte paper may print at half speed at printing device 104. Thus, the job costing information would report 2 "slow" sheets and 48 regular speed sheets. These features are disclosed in greater detail below.

Slow pages may be printing device specific in that a printing device may print a paper or medium at a different speed than another printing device within system 100. Further, engine 260 may be set to run at a two speed mode, such as full speed for normal paper printing and ½ speed automatically for specific papers, sizes, and the like. Feeders, however, such as document feeder tray 230, may be set at ¾ speed. This behavior is set at printing device 104. The operator may not know that a lower speed is being used. Further, operating at half speed will tie up printing device 104. The speed information, however, may be reported to DFE 106.

Slower speeds also may cause an issue in printing operations beyond just sheet delivery. RIP firmware 290 may inform engine 260 that it will deliver the sheet at a certain time. If it cannot, then it will send a message to engine 260 that it cannot meet the time. Engine 260 then will leave gaps in printing. RIP firmware 290 cannot keep up with engine 260. In such an event, printing device 104 may be shutdown. Thus, job costing information related to slow pages is desirable.

FIG. 8 depicts table 800 of printing speeds for different media 802A and 802B loaded onto printing device 104 according to the disclosed embodiments. Table 800 includes a plurality of fields. Field 802 corresponds to the media type loaded onto printing device 104. Field 804 relates to whether high coverage is applicable to a print job for the respective media type. Field 806 relates to the resolution specified by a print job for the respective media type. Field 808 relates to the paper size for the print job. Field 810 relates to the use of low-speed paper for the print job for the respective media type. Field 812 specifies the print speed to be implemented based on the information specified by the other fields.

For example, media type 802A may be inkjet matte paper. Media type 802B may be other papers for use on printing device 104. As disclosed below, the media types may be loaded into a single paper cassette, or tray, 212, or they may be loaded into different paper cassettes, or trays. As shown in table 800, a paper size 808 for a banner may result in a different print speed 812 than for other paper sizes. Print speeds 812 can range from 1/1 speed to ¾ speed. Further, resolution 806 may result in different print speeds 812. A print job 102 specifying a resolution of 600×1200 is printed at ½ speed.

Print job 102, therefore, may include printing sheets on inkjet matte paper, but include banners and higher resolution sheets as well as normal resolution sheets. Further, other media type 802B may be implemented, such as covers or other media related to books, brochures, and the like. Printing device 104, as a result, may print at different speeds depending on the information and entries in fields 802-812. These speeds will impact printing operations, especially if the media types 802A and 802B are located in different cassettes, or loaded trays, 212.

Figure 9:
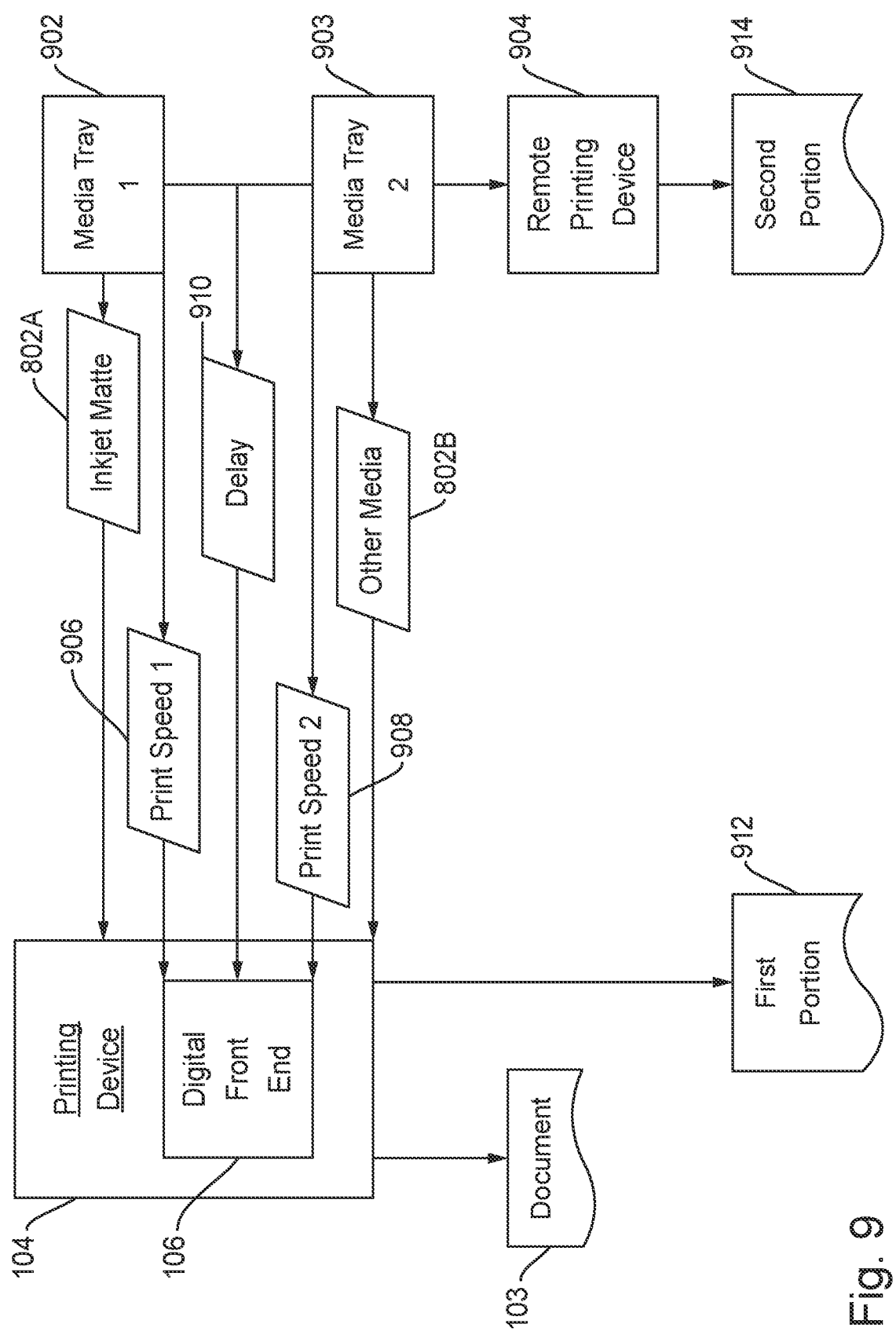
FIG. 9 illustrates a block diagram of trays and media types loaded onto the printing device according to the disclosed embodiments.

FIG. 9 depicts a block diagram of trays and media types loaded onto printing device 104 according to the disclosed embodiments. Media trays 902 and 903 are loaded onto printing device 104. Although shown as "separated" from printing device 104, it should be understood that media trays 902 and 903 are attached to printing device so that they can provide their respective media types for printing operations. Media trays 902 and 903 correspond to paper cassettes 212 disclosed above. The term "media trays" is used to better illustrate the embodiments disclosed herein.

Media tray 902 is loaded with media type 802A, or inkjet matte paper as disclosed above. Media tray 903 is loaded with media type 802B, or other media, that differs from media type 802A. As print job 102 is processed, printing device 104 retrieves the appropriate media type to complete the print job. Further, it may do so at an associated print speed. This print speed may vary according to several factors, as disclosed above with regard to FIG. 8. Printing device 104 generates document 103 using media types 802A and 802B. As can be appreciated, sheets are printed using the different media types. Referring to table 800, speeds to print sheets may range between 1/1 speed to ¾ speed.

Print speed for printing operations is reported to DFB 106 from the respective media tray. Thus, media tray 902 may report print speed 906 while media tray 903 may report print speed 908 to DFE 106. DFE 106 may provide the print speeds in job costing information 117. The processes disclosed above with regard to allocating consumables to different categories then reported with job costing information may be implemented according to print speeds 906 and 908.

In addition to print speed, time to print from media trays 902 and 903 includes time to switch papers or reload trays as needed. In some embodiments, only one media tray is able to be loaded at a time. Thus, use of media types 802A and 802B may require media trays 902 and 903 being switched out depending on what media type is needed. These operations also cause delay in printing operations. Delay 910 may be determined for the time that a media tray is not providing sheets to printing device 104. Delay 910 also is of interest for job costing information 117 as it also represents lost opportunity for printing.

Further, media tray 902 may be a different size than media tray 903. Media tray 902 may hold 3000 sheets while media tray 903 may hold 300 sheets. Thus, even though both media trays can be loaded onto printing device 104 at once, printing operations may require a media tray to be reloaded more often than other media trays. The disclosed embodiments report delay 910 from the respective media tray for these actions during printing operations to DFE 106. For example, a print job using a large number of sheets of media type 802B may require may delay 910 in reloading media tray 903 as opposed to similar operations using media type 802A and media tray 902.

Delay 910 may be determined by DFE 106 as it is informed by engine 260 that printing operations are halted. Sensors, such as sensors 262, may determine that a media tray is removed. DFE 106 then may determine delay 910 when it is determined that printing operations resume.

The disclosed embodiments also may take into account print speeds and delay associated with color printing as opposed to monochrome printing. In these embodiments, media type 802A may relate to sheets being color printed as opposed to media type 802B which are sheets printed using black ink. Color printing by its nature should take longer to print than monochrome printing. Further, cyan, magenta, and yellow ink may need to be replaced more often than black ink. Again, replacement of consumables may result in delay 910. Color printing and monochrome printing does not necessarily result in the use of different media trays. Thus, when discussing these embodiments, media type 802A and media type 802B may actually be the same media type and may come from the same media tray. The printing process and resources used, however, are different which results in different print speeds 906 and 908.

In other embodiments, print job 102 may be printed at two separate printing devices, which also results in differing print speeds 906 and 908. For example, media type 802B may be loaded in media tray 903, which is placed at remote printing device 910. Media type 802B is not available at printing device 104 so that sheets of print job 102 that require this media type cannot be printed thereon. System 100 instructs printing device 104 to send portions of print job 102 that specify media type 802B to remote printing device 904. Thus, DFE 106 may split print job 102 into a first portion 912 of sheets and a second portion 914 of sheets to be printed. First portion 912 is printed at printing device 104 and second portion 914 is printed at remote printing device 904.

This option may be preferred over options that would require switching of media trays at a single printing device. Further, the first portion and the second portion may be two separate parts of print job 102 in that they can later be combined in a finishing operation. For example, first portion 912 may be regular printed sheets while second portion 914 includes punched sheets. Thus, remote printing device 904 provides a finishing operation not available at printing device 104. The disclosed embodiments take into account any reason to split the print job between two different printing devices having different printing speeds. Remote printing device 904 may report its printing speed for media type 802B to DFE 106 or job cost device 118.

Figure 10:
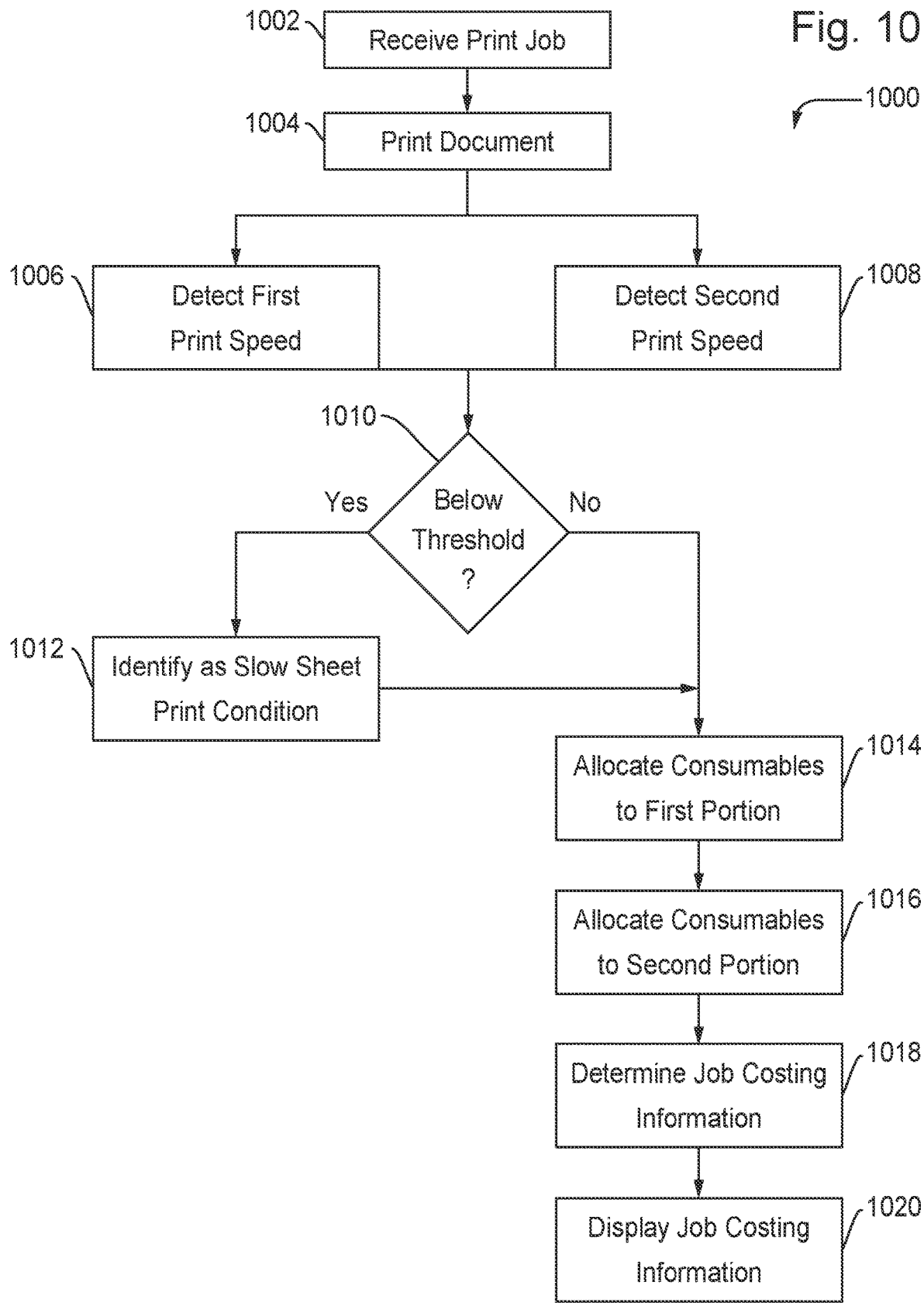
FIG. 10 illustrates a flowchart for printing different media types according to the disclosed embodiments.

FIG. 10 depicts a flowchart 1000 for printing different media types according to the disclosed embodiments. Flowchart 1000 may refer to FIGS. 1A-9 for illustrative purposed. Flowchart 1000, however, is not limited by the embodiments disclosed by FIGS. 1A-9.

Step 1002 executes by receiving print job 102 at printing device 104. This step may be disclosed above. Step 1004 executes by printing document 103 for print job 102 at printing device 104 using consumables from the printing device, such as sheets 112, toner 114, and ink 116. Sheets 112 may be broken further into media types 802A and 802B. As printing device 104 is printing the sheets, it may detect print speeds 906 and 908 for the different media types.

Step 1006 executes by detecting print speed 906 for media type 802A. As disclosed above, print speed 906 may depend on a number of factors associated with the media type. Step 1008 executes by detecting print speed 908 for media types 802B. In some embodiments, print speed 908 differs from print speed 906. For example, print speed 908 may be slower than print speed 906 in that delay 910 may occur as engine 260 accounts for the different print speeds during printing operations.

Step 1010 executes by determining whether print speed 906 or print speed 908 is below a threshold. The threshold may relate to a "slow" printing condition. A slow printing condition may be flagged for causing noticeable delays in printing documents. It may be brought to the operator's attention when reporting job costing information 117. Not every print speed will fall under the threshold. For example, a slow print condition may occur if printing device 104 is printing a media type of one quarter the normal speed. If step 1010 is yes, then step 1012 executes by identifying the slow print speed condition for that media type. For example, print speed 908 is below the threshold. The disclosed embodiments may identify media type 802B is having a slow print condition.

If step 1010 is no, or after step 1012 executes, step 1014 executes by allocating a first amount of consumables, or consumable types as disclosed above, to the first portion, or media type 802A, of print job 102. This process is disclosed in greater detail above. Step 1016 executes by allocating a second amount of consumable, or consumable types, to the second portion, or media type 802B, of print job 102. If either media type is identified as having a slow print condition, then the consumables allocated to this media type also may be listed in a job costing category separate from the good job costing category but not necessarily in the waste job costing categories.

Step 1018 executes by determining job costing information 117 for print job 102, as disclosed above. The different media types may have their job costing information determined. Along with this information is the print speed information. In other embodiments, only print speeds are included in job costing information 117 such that good and waste amounts are not provided. Step 1020 executes by displaying the amount of consumables associated with the respective print speeds in dashboard 700. The number of sheets, amount of ink, and amount of toner associated with each media type may be displayed. If there are several media types, then this information may be shown by print speeds instead of media types.

FIG. 11 depicts a flowchart 1100 for analyzing print job results having different print speeds 906 and 908 according to the disclosed embodiments. Flowchart 1100 may refer to FIGS. 1A-10 for illustrative purposes. Flowchart 1100, however, is not limited by the embodiments disclosed by FIGS. 1A-10.

Step 1102 executes by receiving print job 102 at printing device 104. This step is disclosed in greater detail above. Step 1104 executes by splitting print job 102 into two or more separate portions to be printed using different media, different media trays, or different printing devices. Further, the split portions may relate to color printing for some sheets and monochrome printing for other sheets. In this example, a first portion 912 and a second portion 914 is generated for printing operations. First portion 912 may relate to media type 802A and second portion 914 may relate to media type 802B. Alternatively, first portion 912 may refer to media tray 902 and second portion 914 may refer to media tray 903, even though the media types are the same. In other embodiments, first portion 912 may refer to printing device 104 and second portion 914 may refer to remote printing device 904.

Step 1106 executes by printing first portion 912 from media tray 902 at printing device 104. Sheets of media type 802A are printed. Step 1108 executes by determining print speed 906 for first portion 912 from media tray 902. Step 1108 also may determine any applicable delay 910 associated with using media tray 902. Such delay may include switching from media tray 903 to media tray 902, or reloading media type 802A into media tray 902. Step 1110 executes by allocating consumables, or consumable types, to first portion 912. For example, consumables may include sheets 112, ink 116, and toner 114. Step 1112 executes by allocating the consumable types to job costing categories 117, as disclosed above. Flowchart 1100 then proceeds to step 1122, as disclosed below.

Flowchart 1100 may execute steps 1114-1120 after steps 1106-1112, or may execute the steps concurrently therewith. These steps relate to second portion 914. Step 1114 executes by printing second portion 914 from media tray 903. Media tray 903 may be loaded onto printing device 104, or, alternatively, may be loaded onto remote printing device 904. It should be noted that remote printing device 904 is not "remote" but only a different printing device within system 100. Printing devices 104 and 904 may located next to each other and connected using a network in system 100.

Step 1116 executes by determining print speed 908 for printing second portion 914. Print speed 908 may relate to media type 802B or may be related to printing speeds at printing device 904. Step 1116 also may determine any applicable delay 910 associated with printing media type 802B. This delay may include switching media tray 902 with media tray 903. Other delay reasons may be reloading media type 802B into media tray 903. Step 1118 executes by allocating consumables, or consumable types, to second portion 914. For example, consumables may include sheets 112, ink 116, and toner 114. Step 1120 executes by allocating the consumable types to job costing categories 117, as disclosed above.

Step 1122 executes by displaying the results for the allocation of consumables by first and second portions. The results may be shown in dashboard 700 as part of job costing information 117.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for analyzing print job results, the method comprising:
   receiving a print job at a printing device, wherein the print job includes a total number of sheets having a paper size;
   printing the print job using a printing operation at the printing device using consumables including the total number of sheets;
   detecting a first print speed for a first portion of sheets of the total number of sheets during the printing operation, wherein the first portion of sheets have the paper size;
   reporting the first print speed to a digital front end (DFE) of the printing device after the printing operation;
   detecting a second print speed for a second portion of sheets of the total number of sheets during the printing operation, wherein the second print speed is slower than the first print speed and the second portion of sheets have the paper size;
   reporting the second print speed to the DFE of the printing device after the printing operation; and
   allocating a first amount of the consumables to the first portion of sheets having the paper size of the total number of sheets associated with the first print speed as reported to the DFE; and
   allocating a second amount of the consumables to the second portion of sheets having the paper size of the total number of sheets associated with the second print speed as reported to the DFE.

2. The method of claim 1, further comprising determining that the second print speed is below a threshold, wherein the threshold corresponds to a slow print condition within the printing device.

3. The method of claim 1, wherein the consumables include a total number of impressions for the print job.

4. The method of claim 1, wherein the consumables include a total number of page description language (PDL) pages.

5. The method of claim 1, wherein the consumables include a toner amount or an ink amount.

6. The method of claim 1, further comprising allocating the total number of sheets to at least one job costing category.

7. The method of claim 1, wherein the first portion of the total number of sheets corresponds to monochrome printing sheets.

8. The method of claim 7, wherein the second portion of the total number of sheets corresponds to color printing sheets.

9. The method of claim 1, wherein the first portion of the total number of sheets corresponds to a first media having the paper size.

10. The method of claim 9, wherein the second portion of the total number of sheets corresponds to a second media having the paper size.

11. A method for analyzing print job results, the method comprising:
   receiving a print job at a printing device, wherein the print job includes a total number of sheets having a paper size that uses consumables at the printing device;
   printing a first portion of the total number of sheets using a printing operation from a first tray at the printing device;

detecting a first print speed for a first portion of sheets of the total number of sheets during the printing operation, wherein the first portion of sheets have the paper size;

reporting the first print speed for printing the first portion from the first tray to a digital front end (DFE) of the printing device after the printing operation;

printing a second portion of the total number of sheets using the printing operation from a second tray at the printing device;

detecting a second print speed for a second portion of sheets of the total number of sheets during the printing operation, wherein the second portion of sheets have the paper size;

reporting the second print speed for printing the second portion from the second tray to the DFE of the printing device after the printing operation;

allocating a first amount of the consumables to the first portion of sheets having the paper size of the total number of sheets from the first tray associated with the first print speed; and allocating a second amount of the consumables to the second portion of sheets having the paper size of the total number of sheets from the second tray associated with the second print speed.

12. The method of claim 11, further comprising switching the first tray for the second tray at the printing device.

13. The method of claim 12, further comprising wherein the second tray is a current tray at the printing device.

14. The method of claim 11, wherein the consumables include a toner amount or an ink amount.

15. The method of claim 11, wherein the consumables include a total number of impressions for the print job.

16. The method of claim 11, further comprising allocating the total number of sheets to at least one job costing category.

17. A method for analyzing a print job, the method comprising:

receiving a print job at a first printing device, wherein the print job includes a total number of sheets having a paper size that uses consumables;

printing a first portion of sheets of the total number of sheets from a first tray at the first printing device during a printing operation, wherein the first portion of sheets have the paper size;

reporting a first print speed for printing the first portion from the first tray to a digital front end (DFE) of the first printing device after the printing operation;

printing a second portion of sheets of the total number of sheets from a second tray at a second printing device after the printing operation, wherein the second portion of sheets have the paper size;

reporting a second print speed for printing the second portion from the second tray to a DFE of the second printing device after the printing operation;

allocating a first amount of the consumables to the first portion of sheets having the paper size of the total number of sheets from the first tray associated with the first print speed; and allocating a second amount of the consumables to the second portion of sheets having the paper size of the total number of sheets from the second tray associated with the second print speed.

18. The method of claim 17, wherein the consumables include a toner amount or an ink amount.

19. The method of claim 17, wherein the consumables include a total number of impressions for the print job.

20. The method of claim 17, further comprising allocating the total number of sheets to at least one job costing category.

* * * * *